US012725966B2

(12) United States Patent
Davitian

(10) Patent No.: US 12,725,966 B2
(45) Date of Patent: Sep. 1, 2026

(54) FLEXIBLE BOOT FOR DEUTSCH CONNECTOR

(71) Applicant: Joseph Davitian, Queen Creek, AZ (US)

(72) Inventor: Joseph Davitian, Queen Creek, AZ (US)

(73) Assignee: ProwireUSA, Queen Creek, AZ (US)

( * ) Notice: Subject to any disclaimer, the term of this patent is extended or adjusted under 35 U.S.C. 154(b) by 225 days.

(21) Appl. No.: 18/237,812

(22) Filed: Aug. 24, 2023

(65) Prior Publication Data

US 2024/0072487 A1 Feb. 29, 2024

Related U.S. Application Data

(60) Provisional application No. 63/401,285, filed on Aug. 26, 2022.

(51) Int. Cl.
*H01R 13/53* (2006.01)
*H01R 13/516* (2006.01)
*H01R 13/533* (2006.01)

(52) U.S. Cl.
CPC ......... *H01R 13/533* (2013.01); *H01R 13/516* (2013.01)

(58) Field of Classification Search
CPC . H01R 13/533; H01R 13/516; H01R 13/5221
See application file for complete search history.

(56) References Cited

U.S. PATENT DOCUMENTS 5,605,468 A * 2/1997 Wood .................. H01R 13/523 439/282
6,162,087 A * 12/2000 Hiura ................. H01R 13/5213 174/152 G
6,223,777 B1 * 5/2001 Smith ..................... E04D 13/08 138/119
7,311,555 B1 * 12/2007 Burris .................... H01R 13/52 439/594
11,742,611 B2 * 8/2023 Daoust ................... F16J 15/022 439/277
2003/0063867 A1 * 4/2003 McDonald ........... G02B 6/3897 385/76
2014/0134878 A1 * 5/2014 Van Swearingen ...... H01G 2/10 439/607.01

(Continued)

*Primary Examiner* — Truc T Nguyen
(74) *Attorney, Agent, or Firm* — Rutan & Tucker LLP; Hani Z. Sayed

(57) ABSTRACT

An apparatus and methods are provided for a pliable boot for Deutsch connectors. The boot is made of rubber or any other material that is amenable to being easily pushed onto and removed from a Deutsch connector. The boot comprises a hollow member extending from cylindrical portion to an adapter portion. The cylindrical portion receives any of a group of electrical wires that are routed into the Deutsch connector. The adapter portion includes a back opening that receives a shrink boot adapter comprising the Deutsch connector. The adapter portion includes a lip to engage with a recess disposed around the shrink boot adapter. A transition portion is disposed between the cylindrical portion and the adapter portion. An interior shape of the boot increases in size along a length of the transition portion from the cylindrical portion to the adapter portion.

18 Claims, 3 Drawing Sheets

(56) References Cited

U.S. PATENT DOCUMENTS

| | | | | |
|---|---|---|---|---|
| 2015/0380861 | A1* | 12/2015 | Harwath | H01R 13/533 385/86 |
| 2021/0122305 | A1* | 4/2021 | Tasaka | H02G 3/0462 |
| 2023/0170644 | A1* | 6/2023 | Ahn | H01M 50/172 439/604 |

* cited by examiner

FIG. 3
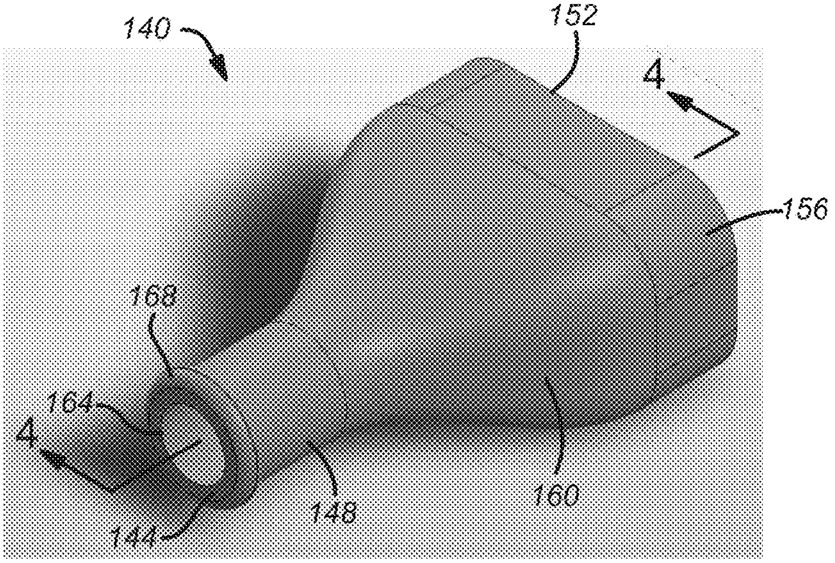
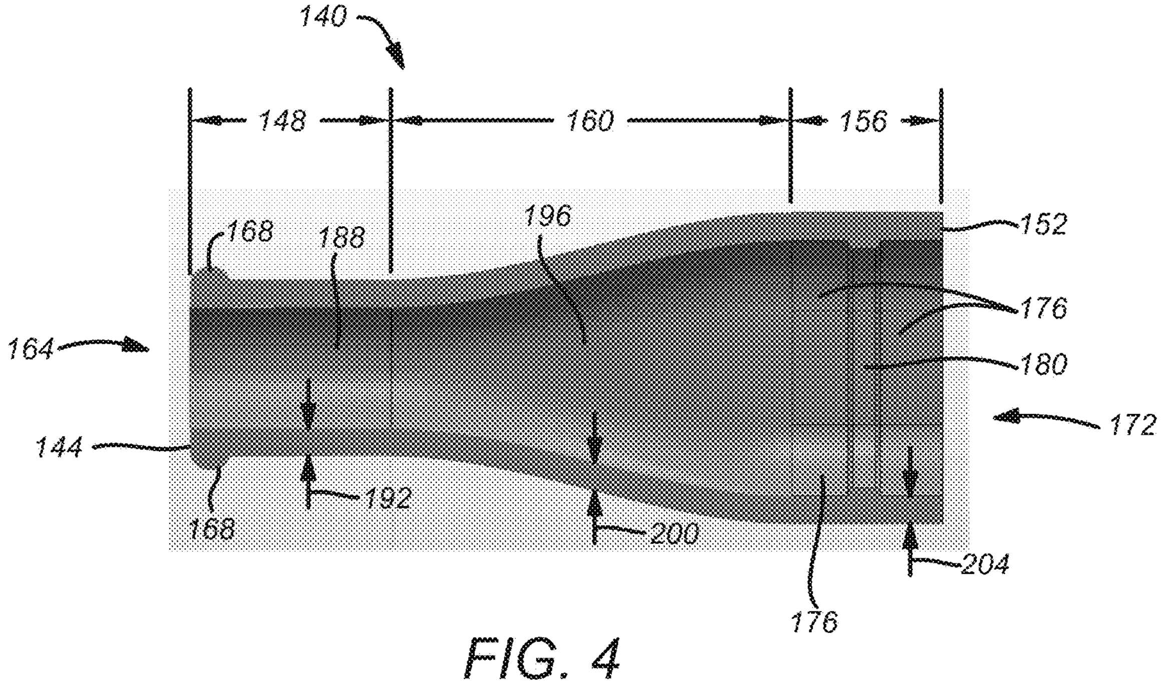
FIG. 4

140
180
152
184
100
176
128
164
188
196
120
128
180
152
184

220
212
228

236
208
216
224
232
252
244
256
248
240
276
264
272
296
268
284
260
100
288
280
292
148
140
160
156

FLEXIBLE BOOT FOR DEUTSCH CONNECTOR

PRIORITY

This application claims the benefit of and priority to U.S. Provisional Application, filed on Aug. 26, 2022 and having application Ser. No. 63/401,285, the entirety of said application being incorporated herein by reference.

FIELD

Embodiments of the present disclosure generally relate to electrical connectors. More specifically, embodiments of the disclosure relate to an apparatus and methods for a flexible boot for Deutsch Connectors.

BACKGROUND

Deutsch connectors are a series of sealed connectors configured for use in harsh environments where field serviceability is required. Deutsch connectors are configured to be disconnected and reconnected a multitude of times, and thus these connectors an ideal choice for a wide range of applications. In particular, a DTM variety of Deutsch connectors fills a need for lower amperage, multi-pin connections. Deutsch DTM connectors generally are available in 2, 3, 4, 6, 8, and 12 pin counts and use size 20 Deutsch contacts, each with a 7.5-Amp continuous current capacity. Deutsch DTM connectors may be mounted in-line, flanged, or used for PCB mount applications. These connectors typically are made of thermoplastic and feature silicone rear wire and interfacial seals that enable the connectors to withstand extreme temperatures and moisture.

FIG. 1 illustrates a rear perspective view of an exemplary embodiment of a Deutsch DTM connector 100. The connector 100 generally comprises a housing 104 that extends from a back end 108 to a front end 112. The back end 108 includes an opening 116 that enables female electrical connections to be mounted into the housing 104. As such, the opening 116 is configured to support electrical wires extending into the opening 116 to the connections. As will be appreciated, the front end 112 generally is configured to mate with a housing that supports male pin connections. An integrated latch 118 is configured for mating the housings.

In the embodiment of the connector 100 shown in FIG. 1, a shrink boot adapter 120 is disposed on an exterior of the housing 104 adjacent to the back end 108. The adapter 120 comprises an extended smooth surface 124 and an exterior recess 128. The extended smooth surface 124 is configured to receive a shrink-wrap boot that may be heated so as to tighten onto the adapter 120. The recess 128 serves as a feature that keeps the shrink-wrap boot from sliding off the adapter 120 during use of the connector 100.

A drawback to mounting a shrink-wrap boot onto the connector 100 is that the shrink-wrap boot generally is damaged during field servicing the connector 100. As will be recognized, the shrink-wrap boot must be removed from the shrink boot adapter 120 before the electrical connections and wires may be removed from the connector 100. As such, the shrink-wrap boot must be broken free of the recess 128 before removed from the shrink boot adapter 120, thereby causing the shrink-wrap boot to fit loosely on the adapter 120 upon reassembly of the connector 100. In some instances, the shrink-wrap boot must be cut free of the adapter 120 and a new shrink-wrap boot installed onto the adapter 120. Installing a new shrink-wrap boot, however, is inconvenient during field servicing the connector 100 due at least to a need for heating equipment required to shrink the boot onto the adapter 120.

Therefore, a need exists for a field serviceable boot that may be disconnected and reconnected a multitude of times without any need for being heated onto the shrink boot adapter 120 shown in FIG. 1.

SUMMARY

An apparatus and methods are provided for a pliable boot for Deutsch connectors. The boot is made of rubber or any other material that is amenable to being easily pushed onto and removed from a Deutsch connector. The boot comprises a hollow member extending from a front end of a cylindrical portion to a back end of an adapter portion. The cylindrical portion receives any of a group of electrical wires that are routed into the Deutsch connector. The adapter portion includes a back opening that receives a shrink boot adapter comprising the Deutsch connector. The adapter portion includes a lip to engage with a recess disposed around the shrink boot adapter. A transition portion is disposed between the cylindrical portion and the adapter portion. An interior shape of the boot increases in size along a length of the transition portion from the cylindrical portion to the adapter portion.

In an exemplary embodiment, a pliable boot for a Deutsch connector comprises: a hollow member extending from a front end of a cylindrical portion to a back end of an adapter portion; a transition portion disposed between the cylindrical portion and the adapter portion; a ridge circumferentially disposed around the front opening; and a lip extending around at least a portion of a perimeter of an inner surface of the adapter portion.

In another exemplary embodiment, the pliable boot is configured to be pushed onto and removed from the Deutsch connector. In another exemplary embodiment, the pliable boot is made of rubber or any other material that is amenable to being easily pushed onto and removed from the Deutsch connector.

In another exemplary embodiment, the cylindrical portion includes a front opening that is configured to receive any of a group of electrical wires, a wiring harness, a wiring conduit, or any other type of conductors that may be routed into the Deutsch connector. In another exemplary embodiment, the ridge is configured to enhance an ability of the cylindrical portion to grip conductors extending through the cylindrical portion. In another exemplary embodiment, the lip is configured to engage with a recess disposed around a shrink boot adapter comprising the Deutsch connector. In another exemplary embodiment, the lip is configured to fit into the recess when the back end of the adapter portion is substantially touching a ridge comprising the shrink boot adapter.

In another exemplary embodiment, the inner surface of the adapter portion extends from an inner surface of the transition portion to the lip and then extends from the lip to the back end. In another exemplary embodiment, the adapter portion comprises a sidewall portion of the pliable boot having a thickness that is substantially uniform along the length of the adapter portion. In another exemplary embodiment, the adapter portion includes a back opening that is configured to receive a shrink boot adapter comprising the Deutsch connector. In another exemplary embodiment, the inner surface of the adapter portion is configured to slide over an exterior surface of the shrink boot adapter. In another exemplary embodiment, a perimeter shape of the inner surface is configured to match the shape of the exterior surface so as to provide a moisture resistant union between the pliable boot and the shrink boot adapter. In another exemplary embodiment, the inner surface is sized suitably to allow the pliable boot to be pushed onto the shrink boot adapter without an undue level of difficulty.

In another exemplary embodiment, the cylindrical portion includes an inner surface that extends from the front end into an interior of the pliable boot. In another exemplary embodiment, the inner surface of the cylindrical portion comprises an inner diameter of the pliable boot that is substantially uniform along a length of the cylindrical portion. In another exemplary embodiment, the cylindrical portion comprises a sidewall portion of the pliable boot having a substantially uniform thickness.

In another exemplary embodiment, an inner surface of the cylindrical portion extends to an inner surface of the transition portion. In another exemplary embodiment, the inner surface of the transition portion comprises an inner perimeter shape of the pliable boot that increases along a length of the transition portion to the adapter portion. In another exemplary embodiment, an increase in the inner perimeter shape may differ along different dimensions of the pliable boot. In another exemplary embodiment, the increase in the inner perimeter shape depends upon a number and an arrangement of electrical contacts comprising the Deutsch connector. In another exemplary embodiment, the transition portion comprises a sidewall portion of the pliable boot having a thickness that is substantially uniform along the length of the transition portion.

These and other features of the concepts provided herein may be better understood with reference to the drawings, description, and appended claims.

BRIEF DESCRIPTION OF THE DRAWINGS

The drawings refer to embodiments of the present disclosure in which:

FIG. 3 illustrates a front perspective view of an exemplary embodiment of a pliable boot, according to the present disclosure;

FIG. 4 illustrates a cross-sectional view of the pliable boot shown in FIG. 3, taken along line 4-4, according to the present disclosure;

Figure 1:
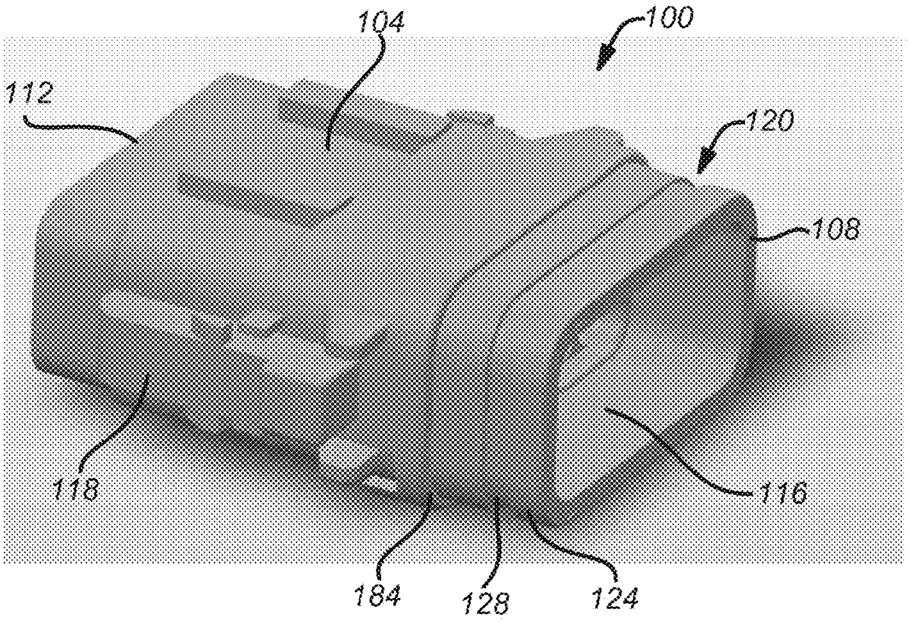
FIG. 1 (Prior Art)
FIG. 1 illustrates a rear perspective view of an exemplary embodiment of a Deutsch DTM connector that is configured to receive a pliable boot, according to the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the pliable boot and methods disclosed herein may be practiced without these specific details. In other instances, specific numeric references such as "first recess," may be made. However, the specific numeric reference should not be interpreted as a literal sequential order but rather interpreted that the "first recess" is different than a "second recess." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Deutsch connectors are configured to be disconnected and reconnected a multitude of times and thus are an ideal choice for a wide range of applications where field serviceability is required. Many Deutsch connectors are configured to receive a shrink-wrap boot that may be heated and tightened onto the connector. A drawback to mounting a shrink-wrap boot onto the connector is that the shrink-wrap boot generally is damaged during field servicing the connector. Removing the shrink-wrap boot from the connector typically causes the shrink-wrap boot to fit loosely upon reassembly of the connector. In many instances, the shrink-wrap boot must be cut free of the connector and a new shrink-wrap boot installed onto the connector. Installing a new shrink-wrap boot, however, is inconvenient during field servicing the connector due to a need for heating equipment required to shrink the boot onto the connector. A need exists, therefore, for a field serviceable boot that may be disconnected and reconnected a multitude of times without any need for being heated onto the connector. Embodiments presented herein provide pliable boots that may be quickly and easily pushed onto and removed from Deutsch connectors without any need for specialized equipment.

Figure 2:
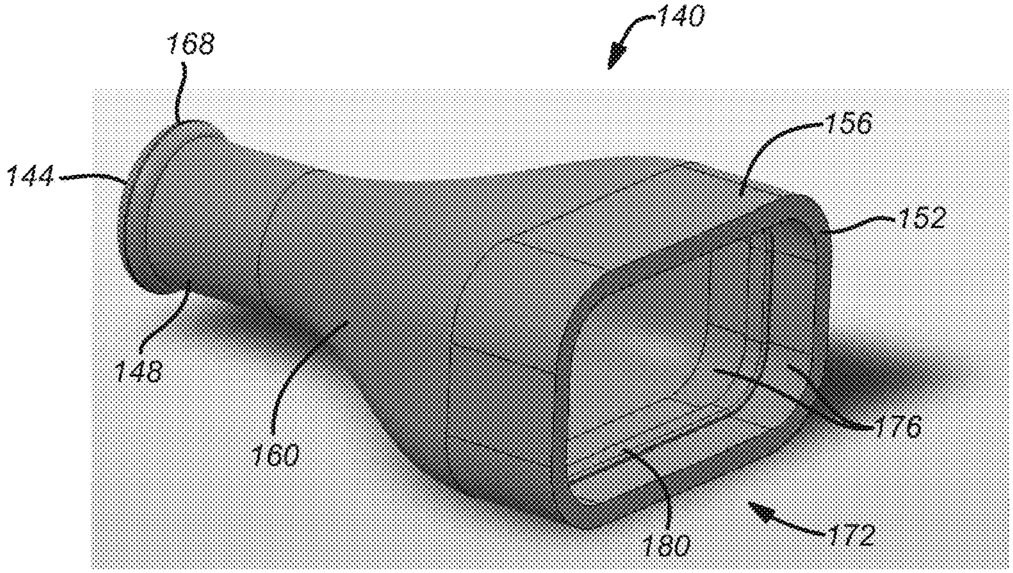
FIG. 2 illustrates a rear perspective view of an exemplary embodiment of a pliable boot in accordance with the present disclosure.

FIGS. 2-3 illustrate perspective views of an exemplary embodiment of a pliable boot 140 that is configured to be pushed onto and removed from a Deutsch DTM connector 100 according to the present disclosure. The pliable boot 140 may be made of rubber or any other material that is amenable to being easily pushed onto and removed from the connector 100, as described herein.

It should be borne in mind that the pliable boot 140 discussed herein is not to be limited solely to use with the connector 100 shown in FIG. 1. For example, the pliable boot 140 may be implemented with a variety of different sizes for use with various sizes of Deutsch DTM connectors, according to the present disclosure. Further, the pliable boot 140 is not to be limited to use with Deutsch DTM connectors, but rather pliable boot 140 may be adapted to be used with any of the Deutsch series of connectors, without limitation. For example, the pliable boot 140 may be used with any of the Deutsch DTM series of connectors shown and described herein, any of Deutsch DTP series of connectors (including 2-way and 4-way versions), and any of Deutsch DT series of connectors. Moreover, the pliable boot 140 may be configured for use with any of Amphenol series of connectors, including, but not limited to, any of Amphenol ATM series of connectors, any of Amphenol ATP series of connectors (including 2-way, 4-way and 6-way versions), and any of Amphenol AT (including 13-way, 15-way, and 18-way versions), without limitation.

The pliable boot 140 is a generally hollow member extending from a front end 144 of a cylindrical portion 148 to a back end 152 of an adapter portion 156. The cylindrical portion 148 and the adapter portion 156 share an intervening transition portion 160. As shown in FIG. 3, the cylindrical portion 148 includes a front opening 164 that is configured to receive any of a group of electrical wires, a wiring harness, a wiring conduit, or any other type of conductors that may be routed into the opening 116 of the connector 100 shown in FIG. 1. A ridge 168 is circumferentially disposed around the front opening 164 and configured to enhance the ability of the cylindrical portion 148 to grip the conductors extending through the cylindrical portion 148. It is contemplated, however, that the ridge 168 may be disposed in any of various positions on the cylindrical portion 148, without limitation. Further, in some embodiments, any of various additional ridges 168 may be incorporated into the pliable boot 140, without limitation.

As best shown in FIG. 2, the adapter portion 156 includes a back opening 172 that is configured to receive the shrink boot adapter 120 comprising the connector 100 shown in FIG. 1. As such, the adapter portion 156 includes an inner surface 176 that is configured to slide over an exterior surface of the shrink boot adapter 120. It is contemplated that a perimeter shape of the inner surface 176 generally matches the shape of the exterior surface of the shrink boot adapter 120 so as to provide a moisture resistant union between the pliable boot 140 and the shrink boot adapter 120. It is further contemplated that the inner surface 176 is sized suitably to allow the pliable boot 140 to be pushed onto the shrink boot adapter 120 without an undue level of difficulty.

Figure 5:
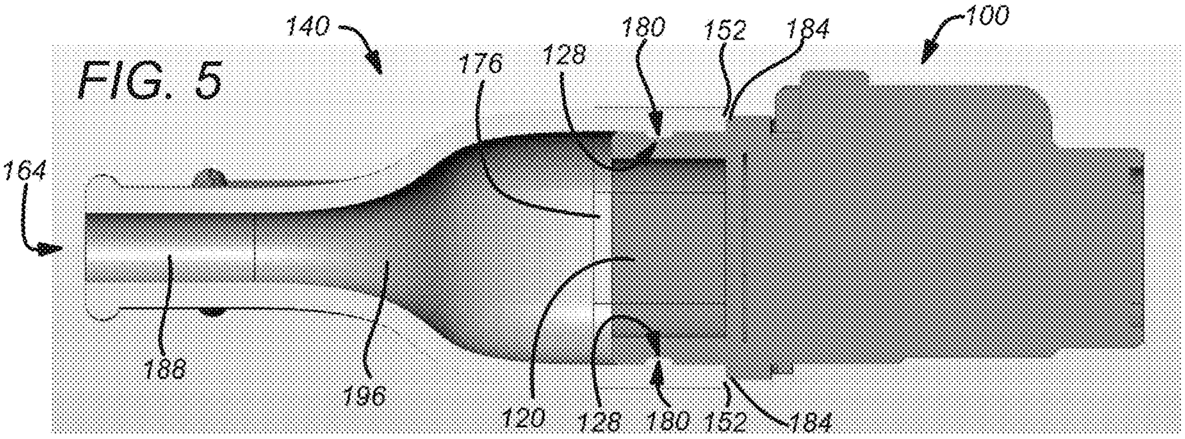
FIG. 5 illustrates a cross-sectional view of an exemplary embodiment of a pliable boot that is engaged with the Deutsch DTM connector of FIG. 1 in accordance with the present disclosure.

As shown in FIG. 2, the inner surface 176 includes a lip 180 that extends around at least a portion of the perimeter of the inner surface 176. In some embodiments, the lip 180 comprises a continuous feature that extends completely around the perimeter of the inner surface 176. In some embodiments, the lip 180 comprises a series of segments that are aligned end to end around the perimeter of the inner surface 176. The lip 180 is configured to engage with the recess 128, shown in FIG. 1, when the adapter portion 156 is advantageously positioned on the shrink boot adapter 120. More specifically, as best shown in FIG. 5, the lip 180 is configured to fit into the recess 128 when the back end 152 of the pliable boot 140 is substantially touching a ridge 184 comprising the shrink boot adapter 120.

Turning, now, to FIG. 4, a cross-sectional view of the pliable boot 140 is shown, taken along line 4-4 of FIG. 3. As shown in FIG. 4, the cylindrical portion 148 includes an inner surface 188 that extends from the front end 164 into an interior of the pliable boot 140. The inner surface 188 comprises an inner diameter of the pliable boot 140 that is substantially uniform along the length of the cylindrical portion 148. Further, aside from the location of the ridge 168, the cylindrical portion 148 comprises a sidewall portion of the pliable boot 140 having a substantially uniform thickness 192. In some embodiments, however, the thickness 192 of the cylindrical portion 148 may be varied, as desired, without limitation.

With continuing reference to FIG. 4, the inner surface 188 extends to an inner surface 196 of the transition portion 160. The inner surface 196 comprises an inner perimeter shape of the pliable boot 140 that increases along a length of the transition portion 160 to the adapter portion 156. Upon comparing FIGS. 3 and 4, it should be understood that the increase in the inner perimeter shape may differ along different dimensions of the pliable boot 140. In general, the increase in the inner perimeter shape will depend upon the number of electrical contacts comprising the connector 100 as well as their arrangement within the opening 116. For example, in the illustrated embodiment, the pliable boot 140 is configured to fit onto a connector 100 that includes two rows of six electrical contacts. As such, the inner perimeter shape of the transition portion 160 increases more in width than height to join with the adapter portion 156, as shown in FIG. 3. Further, the transition portion 160 comprises a sidewall portion of the pliable boot 140 having a thickness 200. Although in the embodiment of FIG. 4 the thickness 200 is substantially uniform along the length of the transition portion 160, in some embodiments the thickness 200 may be varied, without limitation.

As shown in FIG. 4, the inner surface 196 extends to the inner surface 176 of the adapter portion 156, as described with respect to FIG. 2. In the embodiment of FIG. 4, the inner surface 176 extends from the inner surface 196 to the lip 180 and then extends from the lip 180 to the back end 152. The inner surface 176 is configured to slide over the exterior surface of the shrink boot adapter 120, shown in FIG. 1. As such, the perimeter shape of the inner surface 176 generally matches the shape of the exterior surface of the shrink boot adapter 120 so as to provide a moisture resistant union between the pliable boot 140 and the shrink boot adapter 120. Further, the inner surface 176 preferably is sized to allow the pliable boot 140 to be pushed onto and removed from the shrink boot adapter 120 without an undue level of difficulty.

As discussed in connection with FIG. 2, the lip 180 extends around at least a portion of the perimeter of the inner surface 176. The lip 180 is configured to engage with the recess 128, shown in FIG. 1, when the adapter portion 156 is advantageously positioned on the shrink boot adapter 120. As shown in FIG. 5, the lip 180 may be configured to engage with the recess 128 when the back end 152 of the pliable boot 140 is substantially touching or adjacent to the ridge 184 comprising the shrink boot adapter 120. Further, the adapter portion 156 comprises a sidewall portion of the pliable boot 140 having a thickness 204. Aside from the location of the lip 180, the thickness 204 is substantially uniform along the length of the adapter portion 156. In some embodiments, however, the thickness 204 of the adapter portion 156 may be varied, without limitation.

Figure 6:
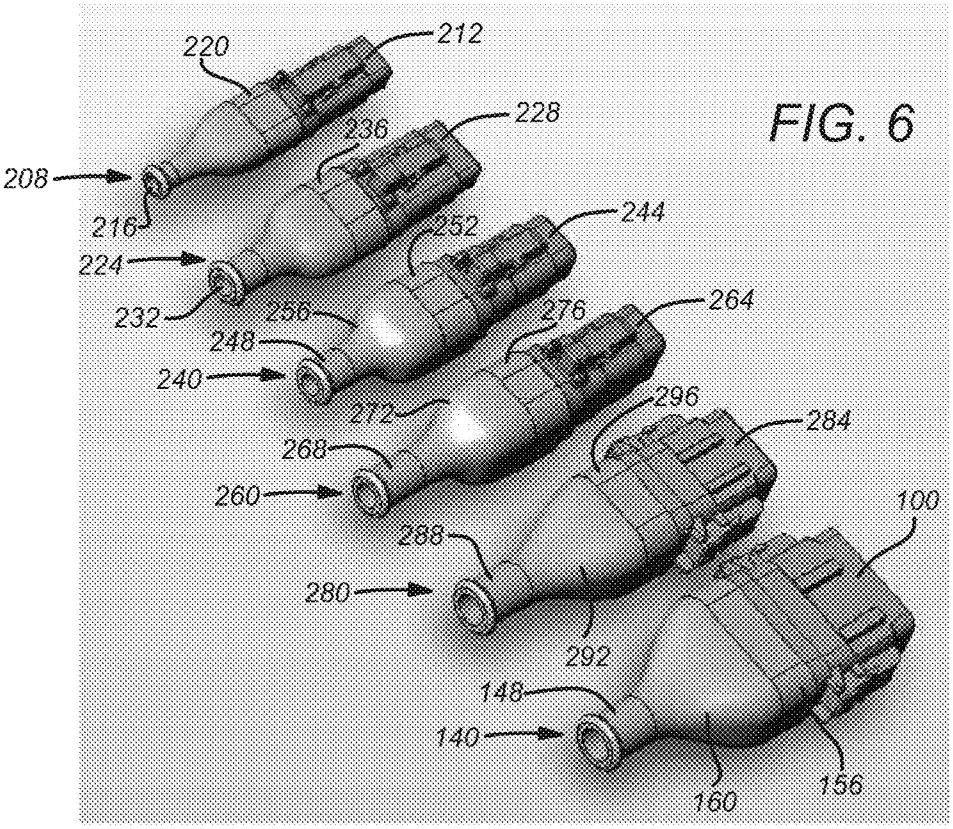
FIG. 6 illustrates a perspective view of several pliable boots that are implemented with a variety of different sizes and coupled with various sizes of the Deutsch DTM connector of FIG. 1.

It should be borne in mind that the pliable boot 140 discussed herein is not to be limited solely to use with the connector 100 shown in FIG. 1. FIG. 6, for example, illustrates a perspective view of several exemplary embodiments of pliable boots that may be implemented with a variety of different sizes for use with various sizes of Deutsch DTM connectors, according to the present disclosure. Further, the pliable boot 140 is not to be limited to use with Deutsch DTM connectors, but rather pliable boot 140 may be adapted to be used with any of the Deutsch series of connectors, without limitation. For example, the pliable boot 140 may be used with any of the Deutsch DTM series of connectors shown and described herein, any of Deutsch DTP series of connectors (including 2-way and 4-way versions), and any of Deutsch DT series of connectors.

Moreover, the pliable boot 140 may be configured for use with any of Amphenol series of connectors, including, but not limited to, any of Amphenol ATM series of connectors, any of Amphenol ATP series of connectors (including 2-way, 4-way and 6-way versions), and any of Amphenol AT (including 13-way, 15-way, and 18-way versions), without limitation.

Turning, now, specifically to the Deutsch DTM connectors shown in FIG. 6, the overall size as well as the height and width of each pliable boot, shown in FIG. 6, depends on the number and arrangement of electrical contacts that are housed in each of the Deutsch DTM connectors. For example, the smallest pliable boot shown in FIG. 6 is a 2-position boot 208 configured to be coupled with a 2-position Deutsch DTM connector 212. The connector 212 houses two electrical contacts, and thus the boot 208 includes a front opening 216 configured to receive any of a pair of electrical wires, a wiring harness, a wiring conduit, or any other type of conductors that may be routed to the two electrical contacts of the connector 212. An adapter portion 220 of the boot 208 is configured to be pushed snugly onto a shrink boot adapter (see FIG. 1) of the connector 212.

As shown in FIG. 6, a 3-position boot 224 is configured to be coupled with a 3-position Deutsch DTM connector 228. The 3-position boot 224 includes a front opening 232 that is configured to receive any of three electrical wires, a wiring harness, a wiring conduit, or any other type of conductors that may be routed to the three electrical contacts comprising the connector 228. An adapter portion 236 of the 3-position boot 224 is configured to snugly engage with a shrink boot adapter (see FIG. 1) of the connector 228. In the embodiment of FIG. 6, the three electrical contacts comprising the connector 228 are arranged into a single row. In some instances, however, the three electrical contacts may be arranged in positions other than a single row. As such, it is contemplated that the 3-position boot 224 may be configured to accommodate various arrangements of the electrical contacts comprising the connector 228, without limitation.

With continuing reference to FIG. 6, a 4-position boot 240 is shown coupled with a 4-position Deutsch DTM connector 244. The 4-position Deutsch DTM connector 244 houses four electrical contacts. As such, the boot 240 includes a cylindrical portion 248 configured to support any of a group of four electrical wires, a wiring harness or conduit, or any other type of conductors that may be routed to the connector 244. Further, the boot 240 includes an adapter portion 252 configured to fit snugly onto a shrink boot adapter (see FIG. 1) of the connector 244. A transition portion 256 extends smoothly front the cylindrical portion 248 to the adapter portion 252, as described herein. In the embodiment of FIG. 6, the four electrical contacts comprising the connector 244 are positioned in two parallel rows of two contacts each. In some instances, however, the electrical contacts may be arranged in positions other than two parallel rows. It should be borne in mind, therefore, that the 4-position boot 240 may be configured to accommodate various arrangements of the electrical contacts comprising the connector 244 other than the two rows illustrated in FIG. 6, without limitation.

With continuing reference to FIG. 6, a 6-position boot 260 is shown coupled with a 6-position Deutsch DTM connector 264. The boot 260 includes a cylindrical portion 268 configured to support six electrical wires, or any other configuration of conductors, that may be routed to the connector 264. A transition portion 272 extends from the cylindrical portion 268 to an adapter portion 276 that is configured to be pressed onto a shrink boot adapter (see FIG. 1) comprising the connector 264. Further, in the embodiment illustrated in FIG. 6, the connector 264 is configured to house two parallel rows each comprising three electrical contacts. In some instances, however, the electrical contacts may be arranged in positions other than two parallel rows. As such, it is contemplated that the 6-position boot 260 may be configured to accommodate various arrangements of the electrical contacts comprising the connector 264 other than the two rows illustrated in FIG. 6, without limitation.

Continuing with reference to FIG. 6, an 8-position boot 280 is shown coupled with an 8-position Deutsch DTM connector 284. The connector 284 is substantially similar to the connector 264, with the exception that the connector 284 is configured to house two additional electrical contacts. As such, the boot 280 is substantially similar to the boot 260, with the exception that the boot 280 includes a cylindrical portion 288 configured to support eight electrical wires, or any other type of configuration of conductors that may be routed to the connector 284. Further, a transition portion 292 extends from the cylindrical portion 288 to an adapter portion 296 that is configured to snugly fit onto a shrink boot adapter (see FIG. 1) comprising the connector 284. As will be appreciated, the connector 284 is configured to house two parallel rows each comprising four electrical contacts. In some embodiments, however, the electrical contacts may be arranged in positions other than two parallel rows, and thus it is contemplated that the boot 280 may be configured to accommodate various arrangements of the electrical contacts comprising the connector 284 other than the two rows illustrated in FIG. 6, without limitation.

With continuing reference to FIG. 6, a 12-position boot 140 is shown coupled with a 12-position Deutsch DTM connector 100. As described herein with reference to FIGS. 2-5, the boot 140 includes a cylindrical portion 148 configured to support a group of electrical wires, or any other type of conductors, that may be routed to the connector 100. A transition portion 160 extends from the cylindrical portion 148 to an adapter portion 156 that is configured to be pressed onto a shrink boot adapter 120 (see FIG. 1) comprising the connector 100. Further, in the illustrated embodiment, the connector 100 is configured to house two parallel rows each comprising six electrical contacts. In some instances, however, the electrical contacts may be arranged in positions other than two parallel rows. As such, it should be understood that the boot 140 may be configured to accommodate various arrangements of the electrical contacts comprising the connector 100 other than the two rows illustrated in FIG. 6, without limitation.

While the pliable boot and methods have been described in terms of particular variations and illustrative figures, those of ordinary skill in the art will recognize that the pliable boot is not limited to the variations or figures described. In addition, where methods and steps described above indicate certain events occurring in certain order, those of ordinary skill in the art will recognize that the ordering of certain steps may be modified and that such modifications are in accordance with the variations of the pliable boot. Additionally, certain of the steps may be performed concurrently in a parallel process, when possible, as well as performed sequentially as described above. To the extent there are variations of the pliable boot, which are within the spirit of the disclosure or equivalent to the pliable boot found in the claims, it is the intent that this patent will cover those variations as well. Therefore, the present disclosure is to be understood as not limited by the specific embodiments described herein, but only by scope of the appended claims.

What is claimed is:

1. A pliable boot for a Deutsch connector, the boot comprising:

a hollow member extending from a front end of a cylindrical portion to a back end of an adapter portion;

a transition portion disposed between the cylindrical portion and the adapter portion;

a front opening of the cylindrical portion configured to receive a group of conductors;

a ridge circumferentially disposed around the front opening, wherein the ridge is configured to enhance an ability of the cylindrical portion to grip conductors extending through the cylindrical portion; and a lip extending around at least a portion of a perimeter of an inner surface of the adapter portion, wherein the lip is configured to engage with a recess disposed around a shrink boot adapter comprising the Deutsch connector.

2. The boot of claim 1, wherein the pliable boot is made of rubber or any other material that is amenable to being easily pushed onto and removed from the Deutsch connector.

3. The boot of claim 1, wherein the front opening is configured to receive any of a group of electrical wires, a wiring harness, a wiring conduit, or any other type of conductors that may be routed into the Deutsch connector.

4. The boot of claim 1, wherein the lip is configured to fit into the recess when the back end of the adapter portion is substantially touching a ridge comprising the shrink boot adapter.

5. The boot of claim 1, wherein the inner surface of the adapter portion extends from an inner surface of the transition portion to the lip and then extends from the lip to the back end.

6. The boot of claim 1, wherein the adapter portion comprises a sidewall portion of the pliable boot having a thickness that is substantially uniform along the length of the adapter portion.

7. The boot of claim 1, wherein the adapter portion includes a back opening that is configured to receive a shrink boot adapter comprising the Deutsch connector.

8. The boot of claim 7, wherein the inner surface of the adapter portion is configured to slide over an exterior surface of the shrink boot adapter.

9. The boot of claim 8, wherein a perimeter shape of the inner surface is configured to match the shape of the exterior surface so as to provide a moisture resistant union between the pliable boot and the shrink boot adapter.

10. The boot of claim 9, wherein the inner surface is sized suitably to allow the pliable boot to be pushed onto the shrink boot adapter without an undue level of difficulty.

11. The boot of claim 1, wherein the cylindrical portion includes an inner surface that extends from the front end into an interior of the pliable boot.

12. The boot of claim 11, wherein the inner surface of the cylindrical portion comprises an inner diameter of the pliable boot that is substantially uniform along a length of the cylindrical portion.

13. The boot of claim 11, wherein the cylindrical portion comprises a sidewall portion of the pliable boot having a substantially uniform thickness.

14. The boot of claim 1, wherein an inner surface of the cylindrical portion extends to an inner surface of the transition portion.

15. The boot of claim 14, wherein the inner surface of the transition portion comprises an inner perimeter shape of the pliable boot that increases along a length of the transition portion to the adapter portion.

16. The boot of claim 15, wherein an increase in the inner perimeter shape may differ along different dimensions of the pliable boot.

17. The boot of claim 16, wherein the increase in the inner perimeter shape depends upon a number and an arrangement of electrical contacts comprising the Deutsch connector.

18. The boot of claim 17, wherein the transition portion comprises a sidewall portion of the pliable boot having a thickness that is substantially uniform along the length of the transition portion.

* * * * *